(12) United States Patent
Lin

(10) Patent No.: US 8,020,013 B2
(45) Date of Patent: Sep. 13, 2011

(54) ADJUSTABLE-VOLTAGE POWER-OVER-ETHERNET (POE) SWITCH

(75) Inventor: David D. Lin, Milpitas, CA (US)

(73) Assignee: Inscape Data Corporation, San Jose, CA (US)

( * ) Notice: Subject to any disclaimer, the term of this patent is extended or adjusted under 35 U.S.C. 154(b) by 844 days.

(21) Appl. No.: 12/074,683

(22) Filed: Mar. 5, 2008

(65) Prior Publication Data

US 2009/0228722 A1   Sep. 10, 2009

(51) Int. Cl.
    G06F 1/26   (2006.01)
(52) U.S. Cl. ......................................... 713/310; 713/300
(58) Field of Classification Search .................. 713/300, 713/310, 340
    See application file for complete search history.

(56) References Cited

U.S. PATENT DOCUMENTS

| | | | |
|---|---|---|---|
| 7,142,951 B2 | 11/2006 | Pincu et al. | |
| 7,154,381 B2 | 12/2006 | Lang et al. | |
| 7,155,622 B2 | 12/2006 | Mancey et al. | |
| 2005/0024026 A1* | 2/2005 | Hung et al. | 323/255 |
| 2005/0281326 A1* | 12/2005 | Yu | 375/222 |
| 2006/0149978 A1* | 7/2006 | Randall et al. | 713/300 |
| 2007/0274322 A1 | 11/2007 | Hansalia | |
| 2008/0294917 A1* | 11/2008 | Khan et al. | 713/310 |
| 2009/0172656 A1* | 7/2009 | Landry et al. | 717/173 |

* cited by examiner

Primary Examiner — Thomas Lee
Assistant Examiner — Paul Yanchus, III
(74) Attorney, Agent, or Firm — Invent Capture, LLC.; Samuel S. Cho

(57) ABSTRACT

An adjustable-voltage Power-over-Ethernet (PoE) switch provides data signals and output electrical powers to a multiple number of output PoE ports. The adjustable-voltage PoE switch has an output voltage-adjusting interface, allowing a user to select a specific power level or a specific output voltage for the particular output PoE port. The adjustable-voltage PoE can also include a conventional IEEE 802.3af-compliant power mode for further utilizing PoE in communicating and powering up external devices. A plurality of light indicators corresponding to the multiple number of output PoE ports provides further convenience by indicating a specific power level or a specific output voltage for a particular output PoE port using a particular color in each color-changing light indicator.

20 Claims, 5 Drawing Sheets

ADJUSTABLE-VOLTAGE POWER-OVER-ETHERNET (POE) SWITCH

BACKGROUND

Modern communications and network equipment often necessitates supplying of electrical power to a multiple number of electrical devices connected to a single electrical hub which provides data connection to the multiple number of electrical devices. In one example, the electrical hub can connect a network equipment (e.g. a network switch, a router, a server, and etc.) with one or more local area network (LAN) data line input and multiple LAN outputs to the multiple number of electrical devices.

A traditional way of supplying power to an electrical device is using a dedicated power supply connection from a DC or AC source to a power input of an electrical device. Sometimes a power adapter plays an intermediary role to convert AC power to DC power before an acceptable input power is supplied to an electrical device. This traditional power supply connection usually requires cumbersome and inconvienient wiring and maintenance, especially if electrical devices are mounted on top of a communication tower (i.e. cellular macro/micro/pico-cell towers, IEEE 802.11-compliant data access points, surveillance cameras, and etc.) or somewhere outdoors.

"Power-over-Ethernet," commonly known as "PoE" in shorthand, is a useful concept which is gaining recognition in the telecommunications and electronic industries today. Instead of requiring dedicated power supply lines, Power-over-Ethernet delivers a useful electrical power using a conventional RJ45-based Ethernet cable while simultaneously supplying required data as an Ethernet cable to an electrical device.

An industry standard, commonly known as IEEE 802.3af, has formed around the Power-over-Ethernet technology several years ago. The IEEE 802.3af standard allows power sourcing equipments to provide desired power via conventional Ethernet cables to electrical devices. The IEEE 802.3af standard operates based on a device-compliance detection scheme. In one example, an IEEE-802.3af-compliant powered device places a 25 k-ohm resistor between powered pairs of an Ethernet input connector.

If an IEEE 802.3af power sourcing equipment detects a resistance that substantially exceeds or underperforms the required 25 k-ohm resistance at the powered pairs of an electrical device connected by an Ethernet cable, the power source equipment realizes that the electrical device is not IEEE 802.3af-compliant and no power is supplied via the Ethernet cable. On the other hand, if the IEEE 802.3af power sourcing equipment detects a resistance of approximately 25 k-ohm at the powered pairs of an electrical device connected by an Ethernet, then the power source equipment realizes that the electrical device is IEEE 802.3af-compliant and begins to supply power to the electrical device. The IEEE 802.3af standard also supports a "power class" detection scheme, which allows powered devices to indicate their power requirements by changing the sense resistance at higher voltages.

In practice, the IEEE 802.3af standard brings several real-life drawbacks for both power souring equipment and powered devices. Many Ethernet-powered devices and their manufacturers today are reluctant to implement IEEE 802.3af standard due to a relatively high cost of standard integration into their devices, which make their products more expensive than competitors. Furthermore, the IEEE 802.3af-compliance detection scheme makes maintenance and debugging difficult for connected devices to a power sourcing equipment. For instance, if a power sourcing equipment is a PoE network switch with a multiple number of input ports and a multiple number of output PoE ports, it is difficult to troubleshoot an IEEE 802.3af-mode-only powered device which may or may not suffer from a faulty power requirement detection scheme based on the IEEE 802.3af standard. Moreover, for outdoor power applications which needs to supply a relatively high amount of power (e.g. for wireless LAN access points, micro/pico cellular towers, surveillance cameras, and etc.) to Ethernet-powered devices than IEEE 802.3af standard's power supply limitations, relying solely on the IEEE 802.3af is undesirable. Therefore, a new type of power sourcing equipment is desired for Power-over-Ethernet applications which resolves or mitigates the drawbacks of relying entirely on the IEEE 802.3af standard.

SUMMARY

An adjustable-voltage Power-over-Ethernet (PoE) switch is configured to provide data signals and/or output electrical powers to a plurality of output PoE ports. The adjustable-voltage PoE switch comprises a plurality of input Ethernet ports configured to carry the data signals and/or an input electrical power as an Ethernet data transfer or a Power-over-Ethernet (PoE) data transfer, a MAC interface between the plurality of input Ethernet ports and a microprocessor for the adjustable-voltage PoE switch, a power source equipment (PSE) controller configured to control a delivery of a direct-current (DC) power as the output electrical powers to a plurality of controlled voltage sources, wherein the DC power is generated by a power supply unit, the plurality of controlled voltage sources configured to regulate output voltages for the output electrical powers in the plurality of output PoE ports, a plurality of transformers configured to combine or separate at least some portions of the output electrical powers from at least some portions of the data signals, the plurality of output PoE ports, wherein one of the plurality of output PoE ports is configured to supply some portions of the output electrical powers and some portions data signals to a first external device, an output voltage-adjusting interface configured to enable a user to select a specific output voltage for a specific output PoE port manually among the plurality of output PoE ports, and the microprocessor configured to take input from the output voltage-adjusting interface and configured to control the PSE controller, the power supply unit, and the plurality of controlled voltage sources.

An adjustable-voltage Power-over-Ethernet (PoE) switch is configured to provide data signals and/or output electrical powers to a plurality of output PoE ports. The adjustable-voltage PoE switch comprises a plurality of input Ethernet ports configured to carry the data signals and/or an input electrical power as an Ethernet data transfer or a Power-over-Ethernet (PoE) data transfer, a MAC interface between the plurality of input Ethernet ports and a microprocessor for the adjustable-voltage PoE switch, a power source equipment (PSE) controller configured to control a delivery of a direct-current (DC) power as the output electrical powers to a plurality of controlled voltage sources, wherein the DC power is generated by a power supply unit, the plurality of controlled voltage sources configured to regulate output voltages for the output electrical powers in the plurality of output PoE ports, a plurality of transformers configured to combine or separate at least some portions of the output electrical powers from at least some portions of the data signals, a first output PoE port from the plurality of output PoE ports configured to supply some of the data signals and a 12-volt and 1-amp power, a 18-volt and 1.5-amp power, a 24-volt and 1.5-amp power, a 48-volt and 1-amp power, or an IEEE 802.3af-compliant power to a first external device, an output voltage-adjusting interface configured to enable a user to select the 12-volt and 1-amp power, the 18-volt and 1.5-amp power, the 24-volt and 1.5-amp power, the 48-volt and 1-amp power, or the IEEE 802.3af-compliant power for the first output PoE port manually, and the microprocessor configured to take input from the output voltage-adjusting interface and configured to control the PSE controller, the power supply unit, and the plurality of controlled voltage sources.

DETAILED DESCRIPTION

Figure 1:
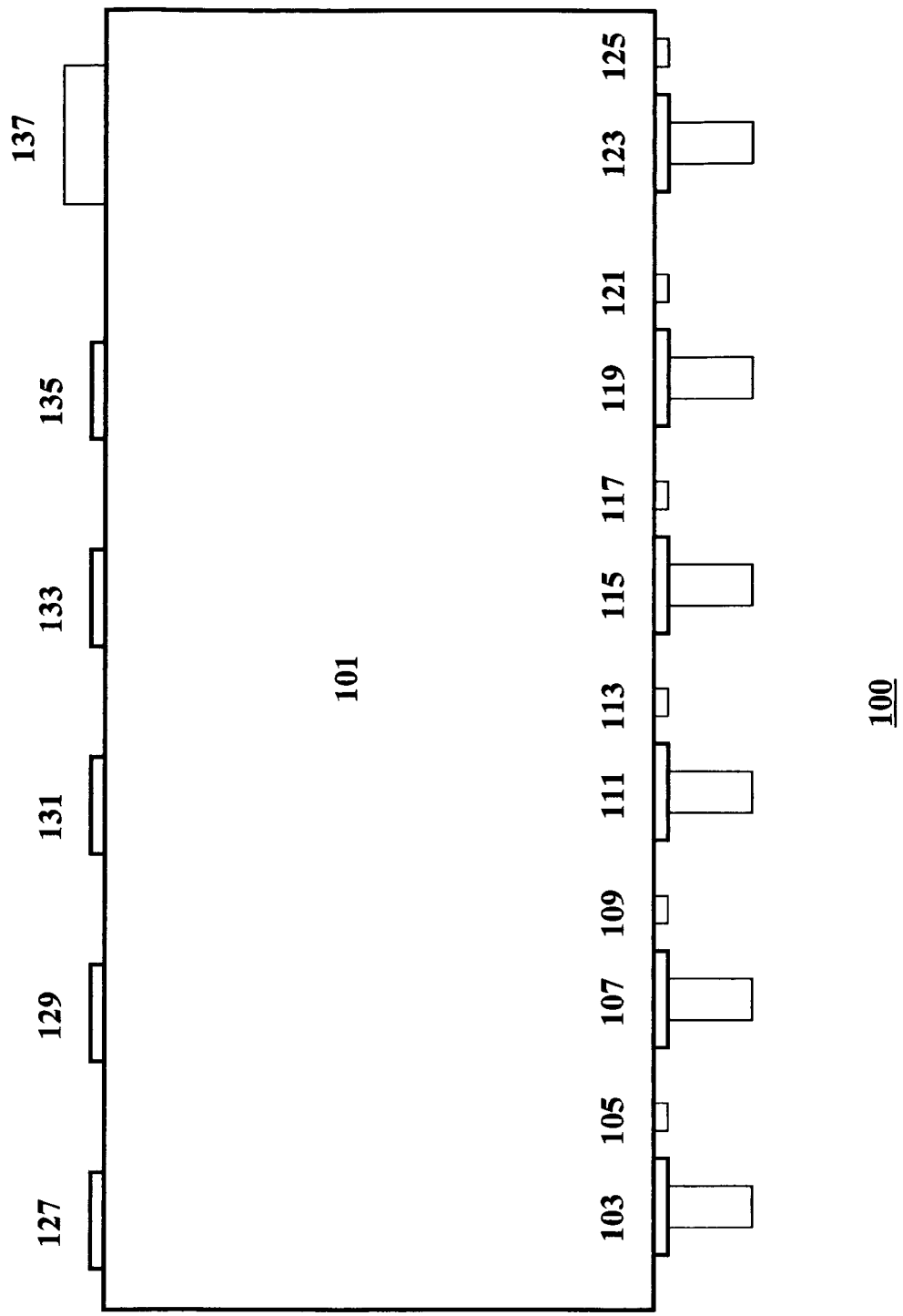
FIG. 1 shows an external top view of an adjustable-voltage Power-over-Ethernet (PoE) switch in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to network switches. More specifically, an embodiment of the invention relate to a network switch which can provide data and power in one standard Ethernet cable to an electrical device, wherein the electrical device is not required to have a separate power supply line to receive sufficient power for operation. Supplying power and data through a standard Ethernet cable is commonly called "Power-over-Ethernet," or PoE technology which has an industry standard protocol called IEEE 802.3af. An embodiment of the present invention supports the IEEE 802.3af standard as well as a customized, novel PoE architecture which allows a user to select a multiple number of desired voltages and current levels for an output PoE port by instructing a microprocessor using an output voltage-adjusting interface.

Another embodiment of the invention relate to providing a high level of power beyond the standard IEEE 802.3af protocol for outdoor use of Power-over-Ethernet (PoE) in powering a multiple number of electrical devices requiring higher wattage than a typical indoor electrical device. For example, a conventional IEEE 802.3af-compliant PoE switch typically supplies only up to 12.95 Watts of power per powered device. In one embodiment of the present invention, an adjustable-voltage Power-over-Ethernet (PoE) switch, which supplies power to a plurality of electrical devices via standard Ethernet cables, can provide a 48-volt and 1-amp of direct current (DC) to two output PoE ports, thereby supplying 48 Watts of power each to two electrical devices via standard Ethernet cables.

Yet another embodiment of the invention relate to providing a weather-resistant adjustable-voltage PoE switch which also incorporates an IEEE 802.3af mode. A weather-resistant outdoor-use housing encapsulates at least some portions of the adjustable-voltage PoE switch and use water-tight connectors for Ethernet wires and any additional power or data wires.

Yet another embodiment of the invention relate to an adjustable-voltage PoE switch configured to provide an alternate-current (AC) source output port configured to supply an AC electrical power to an electrical device.

Furthermore, one objective of the invention is to provide a Power-over-Ethernet (PoE) switch allowing a user to manually adjust voltage and/or current levels for each output PoE port. A further objective of the invention is to provide an IEEE 802.3af-compliant mode as a selectable mode among a plurality of predefined voltage and current selection modes for each output PoE port.

Yet another objective of the invention is to provide higher-power modes to a plurality of output PoE ports beyond the limited power supply specifications of IEEE 802.3af standard. A further objective of the invention is to provide a weather-resistant adjustable-voltage PoE switch with a variety of power selection modes, wherein Ethernet wires and some other wires used in an outdoor application are water-tight. Yet another objective of the invention is to provide a visual indication of a currently-selected power mode for each output PoE port using a particular color of light-emitting diodes (LED's).

FIG. 1 shows an external top view (100) of an adjustable-voltage Power-over-Ethernet (PoE) switch (101) in accordance with an embodiment of the invention. Like most network switches, the adjustable-voltage PoE switch (101) shown in FIG. 1 has a plurality of input Ethernet ports (127, 129, 131, 133, 135) configured to carry data signals into the adjustable-voltage PoE switch (101). Optionally, in one embodiment of the invention, the plurality of input Ethernet ports (127, 129, 131, 133, 135) is configured to carry an input electrical power if at least one of the input Ethernet ports (127, 129, 131, 133, 135) is configured to accommodate a Power-over-Ethernet (PoE) mode.

In one embodiment of the invention, a power supply input (137) is configured to carry electrical power to operate an internal electrical circuitry of the adjustable-voltage PoE switch (101). In one embodiment of the invention, the power supply input (137) provides an alternate-current (AC) electrical power to a power supply unit inside the adjustable-voltage PoE switch (101), wherein the power supply unit converts the alternate-current (AC) electrical power to a direct-current (DC) electricity to power a plurality of output PoE ports (103, 107, 111, 115, 119). Furthermore, in one embodiment of the invention, the alternate-current (AC) electrical power from the power supply input (137) is down-converted to a lower alternate-current (AC) voltage for use by an alternate-current (AC) source output port (123). In one application of this embodiment of the invention, the AC source output port (123) provides a 24-volt and 2-amp AC power to an external electrical device connected to the AC source output port (123). Additionally, an AC source output light indicator (125) made of a light emitting diode (LED) further indicates whether the AC source output port (123) is operational or not.

Continuing with FIG. 1, each output PoE port (103, 107, 111, 115, 119) is configured to supply some electrical power and some data signals to an external device supporting a Power-over-Ethernet (PoE) architecture. In one embodiment of the invention, a specific output voltage and/or a specific current for a particular output PoE port (e.g. 103) are manually user-selectable using an output voltage-adjusting interface. In an inventor's preferred mode (i.e. best mode) of embodiment, manually user-selectable power modes for output PoE ports (103, 107, 111, 115, 119) are predefined to be a 12-volt and 1-amp mode, a 18-volt and 1.5 amp mode, a 24-volt and 1.5 amp mode, a 48-volt and 1-amp mode, and an IEEE 802.3af-compliant mode. In one embodiment of the invention, light indicators (105, 109, 113, 117, 121) located next to each output PoE ports (103, 107, 111, 115, 119) are made of light emitting diodes (LED's). A particular color of each light indicator (105, 109, 113, 117, 121), which can change depending on a selected power mode, represents an operating output voltage of the selected power mode per output PoE port (103, 107, 111, 115, 119).

In one preferred embodiment of the invention, the adjustable-voltage PoE switch (101) is at least partially encapsulated by weather-resistant materials to protect the adjustable-voltage PoE switch (101) from water, debris, and dust. In one instance of the preferred embodiment of the invention, the weather-resistant materials enable the adjustable-voltage PoE switch (101) to be water-proof. Furthermore, Ethernet wires and other wires used for the adjustable-voltage PoE switch (101) use water-tight connectors to connect to the adjustable-voltage PoE switch (101) and a plurality of external devices.

Figure 2:
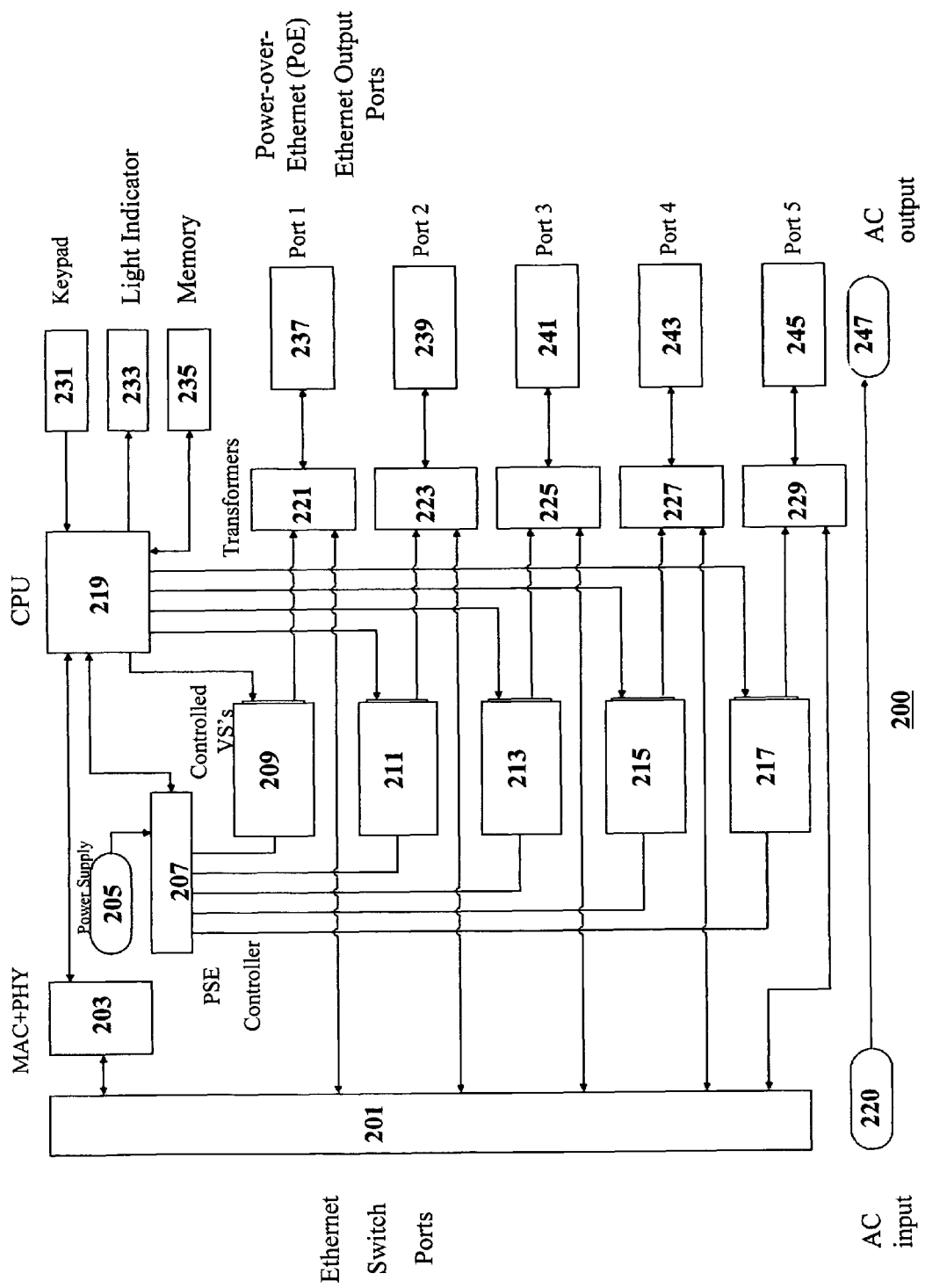
FIG. 2 shows a functional block diagram of an adjustable-voltage Power-over-Ethernet (PoE) switch in accordance with an embodiment of the invention.

FIG. 2 shows a functional block diagram (200) of an adjustable-voltage Power-over-Ethernet (PoE) switch in accordance with a preferred embodiment of the invention. As shown in FIG. 2, a plurality of input Ethernet ports (201) is configured to carry Ethernet data signals into the adjustable-voltage PoE switch. The plurality of input Ethernet ports (201) optionally can also carry one or more input electrical powers if at least one of the input Ethernet ports (201) is configured to utilize Power-over-Ethernet (PoE) technology.

The functional block diagram (200) of the adjustable-voltage PoE switch in FIG. 2 further comprises a MAC (i.e. media access control) interface (203) between the plurality of input Ethernet ports (201) and a microprocessor (219), wherein the MAC interface (203) can fetch, analyze, or decipher relevant networking-layer information back and forth between the microprocessor (219) and incoming or outgoing data signals through the plurality of input Ethernet ports (201). In one preferred embodiment of the invention, the microprocessor (219) is an Intel 8051 microcontroller.

Furthermore, in one preferred embodiment of the invention, at least one of the plurality of input Ethernet ports (201) is configured to carry a TCP/IP-based voltage-adjust instruction to the microprocessor (219) via the MAC interface (203), wherein the TCP/IP-based voltage-adjust instruction contains instructions to set at least one of the plurality of output PoE ports (237, 239, 241, 243, 245) to at least one new desired voltage level. The TCP/IP-based voltage-adjust instruction to the microprocessor (219) via the Mac interface (203) enables remote voltage adjustment of at least one of the plurality of output PoE ports (237, 239, 241, 243, 245) without physically tweaking an output voltage-adjusting interface (231) (e.g. switches, buttons, knobs, keypads, and etc.) attached to the adjustable-voltage PoE switch.

Continuing with FIG. 2, the functional block diagram (200) of the adjustable-voltage PoE switch further comprises a power source equipment (PSE) controller (207) configured to control a delivery of a direct-current (DC) power as output electrical powers to a plurality of controlled voltage sources (209, 211, 213, 215, 217), wherein the DC power is generated by a power supply unit (205). The plurality of controlled voltage sources (209, 211, 213, 215, 217) regulates output voltages for each output electrical power in each output PoE port (237, 239, 241, 243, 245). In one preferred embodiment of the invention, the power supply unit (205) generates a 48-volt and 2.5-amp DC power.

The functional block diagram (200) of FIG. 2 further comprises a plurality of transformers (221, 223, 225, 227, 229) configured to combine or separate each output electrical power from each data signal going through each output PoE port (237, 239, 241, 243, 245) of the adjustable-voltage PoE switch. Each output PoE port (237, 239, 241, 243, 245) is configured to supply a selected amount of electrical power and some data signals from one of the plurality of input Ethernet ports (201) to an external device connected by an Ethernet cable. In one embodiment of the invention, the amount of electrical power at an output PoE port (237) supplied to an external device is selected by a user who can choose a power mode from a plurality of predefined power modes including an IEEE 802.3af-compliant mode. In one embodiment of the invention, the user can choose the power mode by either directly tweaking the output voltage-adjusting interface (231) (e.g. switches, buttons, knobs, keypads, and etc.) attached on the adjustable-voltage PoE switch or by sending a TCP/IP-based voltage-adjust control instruction remotely using a networked electronic device.

Continuing with FIG. 2, the functional block diagram (200) of the adjustable-voltage PoE switch further comprises the output voltage-adjusting interface (231) configured to enable a user to select a specific output voltage manually for a specific output PoE port (e.g. "Port 1" defined by an output PoE port (237)). In one embodiment of the invention, the output voltage-adjusting interface (231) is a keypad which is operatively connected to the microprocessor (219). The microprocessor (219) takes a user input from the keypad and sends instructions to the PSE controller (207) and/or controlled voltage sources (209, 211, 213, 215, 217) to execute the user selection of the specific output voltage for the specific output PoE port (e.g. the output PoE port (237)). The microprocessor (219) also controls the power supply unit (205) which provides a DC power to the PSE controller (207).

The functional block diagram (200) of FIG. 2 further comprises an AC input unit (220) which provides an alternate-current (AC) power for an AC-accepting external device at an AC source output port (247) of the adjustable-voltage PoE switch. In one embodiment of the invention, the AC source output port (247) is not a PoE port and is simply an AC power outlet. In addition, the functional block diagram (200) of FIG. 2 further comprises a plurality of light indicators (233), wherein a color of each light indicator represents a particular power mode or a particular operating output voltage at a particular output PoE port (e.g. a light indicator with orange color representing a particular output voltage at "Port 2" (239)). Moreover, the functional block diagram (200) of FIG. 2 further comprises a memory unit (235) operatively connected to the microprocessor (219). In one embodiment of the invention, the memory unit (235) comprises one or more non-volatile memory modules such as Flash memory and at least some portions of the memory unit (235) are user-programmable. Furthermore, the memory unit (235) can be configured to store state information related to the current adjustable-voltage mode of a particular output PoE port for restoration of the last adjustable-voltage mode in case of a power failure.

Figure 3:
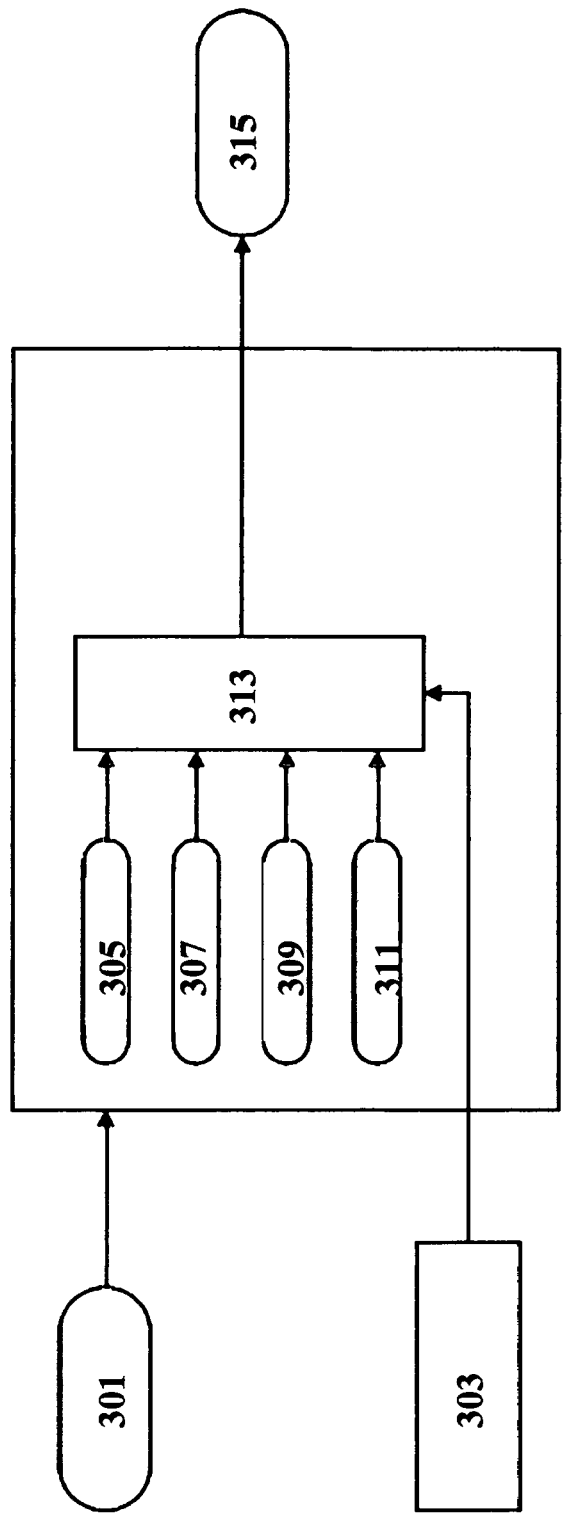
FIG. 3 shows a functional sub-block diagram of a controlled voltage source in accordance with an embodiment of the invention.

FIG. 3 shows a functional sub-block diagram of one particular controlled voltage source (209) of FIG. 2 in accordance with a preferred embodiment of the invention. The controlled voltage source (209) as shown in FIG. 3 comprises a 48 VDC-to-12 VDC/1 A DC-to-DC conversion unit (305), a 48 VDC-to-18 VDC/1.5 A DC-to-DC conversion unit (307), a 48 VDC-to-24 VDC/1.5 A DC-to-DC conversion unit (309), and a 48 VDC-to-48 VDC/1 A DC-to-DC conversion unit (311). In the preferred embodiment of the invention, each DC-to-DC conversion unit (305, 307, 309, 311) receives a DC electrical power from a power supply unit (301) generating 2.5 amps at 48 VDC. A control unit (303) in the controlled voltage source (209) receives a control signal from a microprocessor (e.g. an Intel 8051 microcontroller) to select a desired converted electrical power at a power multiplexer (313). The output power (315) selected from the power multiplexer (313) based on the control signal from the microprocessor is used to power one particular output PoE port, typically after some power transformations using power transformers described in FIG. 2.

In addition, the controlled voltage source (209) shown in FIG. 3 can also provide a DC power for operation of an internal circuitry of a adjustable-voltage PoE switch. For example, the internal circuitry of one particular adjustable-voltage PoE switch embodying the present invention may have a power requirement of 5 VDC and 100 mA. By down-converting at least a portion of the power supply unit (301), the controlled voltage source (209) can provide the required power (i.e. 5 VDC/100 mA) for the internal circuitry of the adjustable-voltage PoE switch.

In one embodiment of the invention, an adjustable-voltage PoE switch has five output PoE ports (237, 239, 241, 243, 245), as shown in FIG. 2. In this particular embodiment, the five output PoE ports (237, 239, 241, 243, 245) cannot exceed a total of 100 watts for power supplied to external devices connected to the output PoE ports. As an example, a 12-volt and 1-amp power can be supplied to all five output PoE ports (237, 239, 241, 243, 245) if a user chooses this power mode for all five output PoE ports (237, 239, 241, 243, 245) because the combined total power consumption is still less than 100 watts (i.e. 12V×1 A×5 ports=60 watts). As the amount of power per output PoE port increases, however, not all output PoE ports can be supplied with the same amount of power.

For instance, a 48-volt and 1-amp power mode can be only used in a maximum of two output PoE ports (i.e. 48V×1 A×2 ports=96 Watts) because trying to squeeze in the same power mode in a third output PoE port will result in insufficient power transfer to active output PoE ports. It should be noted that there are also inherent power losses in power down-conversions and transformations from the power supply to a controlled voltage source, and from the controlled voltage source to a power transformer In addition, there are further power losses due to resistivity in electrical interconnects and internal wirings. Therefore, a reasonable amount of power loss estimation is important for implementing necessary logic for power management of output PoE ports.

Figure 4:
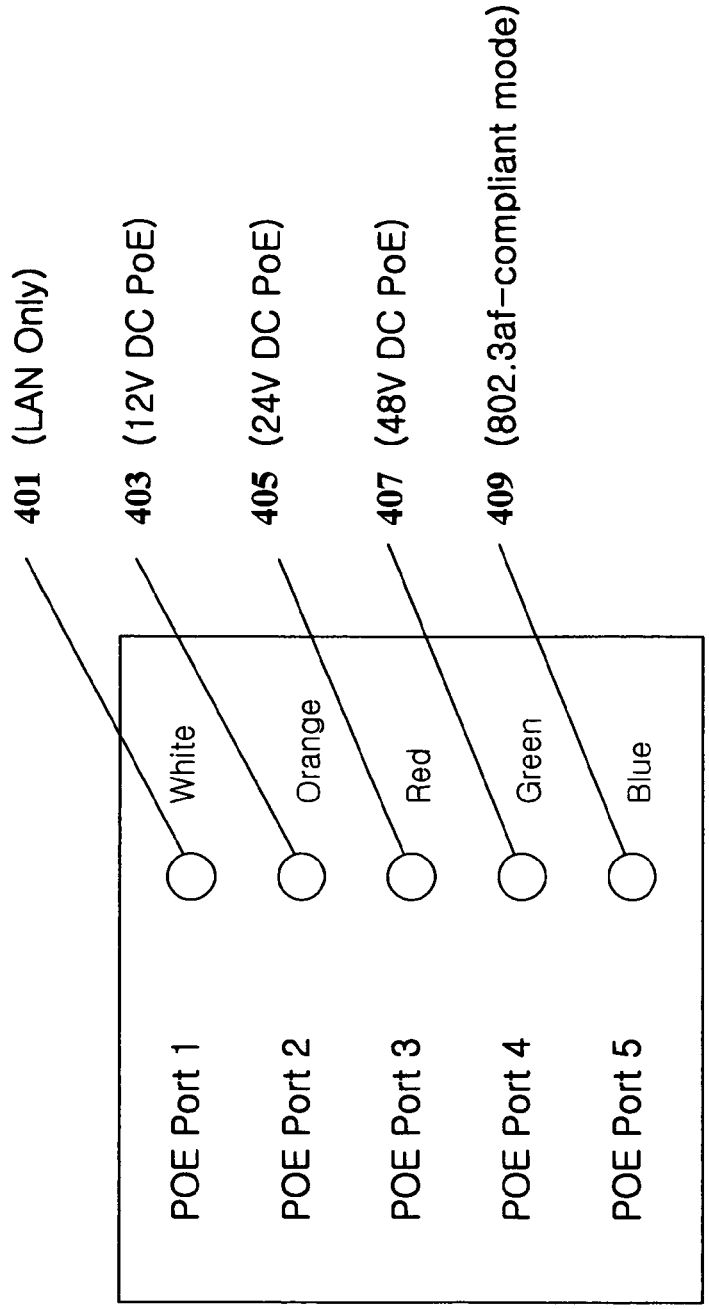
FIG. 4 shows an example of using multi-color light indicators in accordance with an embodiment of the invention.

FIG. 4 shows an example of using multi-color light indicators (233) in accordance with an embodiment of the invention. In this particular embodiment, one output PoE port corresponds to one light indicator, and a color of a particular light indicator represents a particular user-selected power mode or a particular user-selected operating output voltage for that output PoE port. The multi-color light indicators (233) typically comprise light emitting diodes (LED's).

Illustrating by example, FIG. 4 shows a first light indicator (401) glowing in white color for PoE Port 1. In one embodiment of the invention, the white color for the first light indicator (401) represents a LAN-only mode without power supplied to a connected external device. Similarly, a second light indicator (403) is glowing in orange color for PoE Port 2. In one embodiment of the invention, the orange color for the second light indicator (403) represents a 12-VDC PoE mode. Furthermore, a third light indicator (405) is glowing in red color for PoE Port 3. In one embodiment of the invention, the red color for the third light indicator (405) represents a 24-VDC PoE mode. Moreover, a fourth light indicator (407) is glowing in green color for PoE Port 4. In one embodiment of the invention, the green color for the fourth light indicator (407) represents a 48-VDC PoE mode. Lastly, a fifth light indicator (409) is glowing in blue color for PoE Port 5. In one embodiment of the invention, the blue color for the fifth light indicator (409) represents an IEEE 802.3af-compliant PoE mode.

Figure 5:
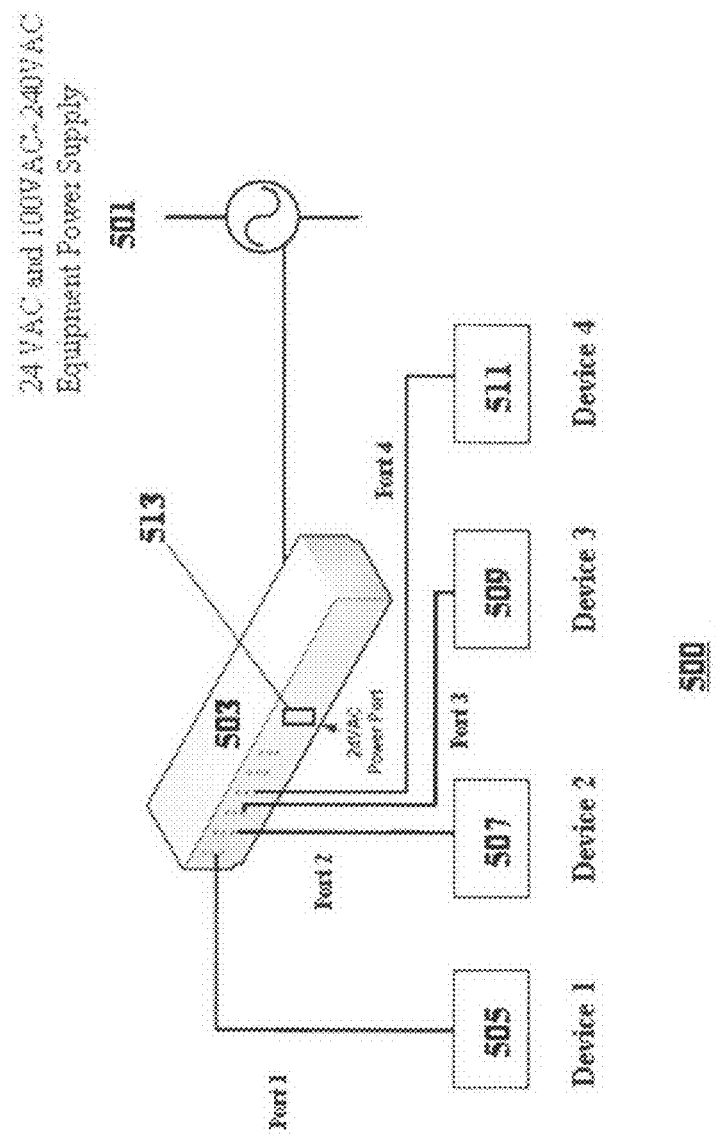
FIG. 5 shows an application of an adjustable-voltage Power-over-Ethernet (PoE) switch in accordance with an embodiment of the invention.

FIG. 5 shows an application (500) of an adjustable-voltage Power-over-Ethernet (PoE) switch (503) in accordance with an embodiment of the invention. An AC-electrical power can be supplied at the alternate-current (AC) source output port (513). In one embodiment of the invention, the AC source output port (513) provides a 24-VAC and 2-amp power. An equipment power supply (501) typically provides a 24-VAC or a 100 VAC~240 VAC power to the adjustable-voltage PoE switch (503).

External devices (505, 507, 509, 511) in FIG. 5 are connected to the adjustable-voltage PoE switch (503) by a plurality of Ethernet cables inserted to corresponding output PoE ports (e.g. Port 1, Port 2, Port 3, Port 4). In one embodiment of the invention, Device 1 (505), Device 2 (507), Device 3 (509), and/or Device 4 (511) can be a Voice-over-IP device, a network camera, a network access point, a router, a network bridge, or another communication device utilizing Power-over-Ethernet.

The present invention provides several key benefits to conventional PoE switches. Although conventional PoE switches can provide a standardized IEEE 802.3af protocol for supplying power and transferring data to external devices, many external device manufacturers are reluctant to drive up the cost of hardware by incorporating a relatively-expensive 802.3af protocol compliance. In contrast, the present invention provides an adjustable-voltage PoE switch which can provide commonly-used voltage and current levels to typical external devices by allowing a user to adjust voltage and/or current levels manually for each output PoE port. Because the present invention supports the Power-over-Ethernet (PoE) technology for commonly-used power specifications of electrical devices, a device manufacturer does not have to implement the relatively-expensive 802.3af protocol compliance to utilize the Power-over-Ethernet technology which simplifies power connection wiring for many external devices. Furthermore, troubleshooting and debugging external device connections with the adjustable-voltage PoE switch are substantially simpler because the IEEE 802.3af-compliant power detection scheme, which may introduce a common reason for a faulty connection, can be bypassed while working with a known voltage and a known current supplied by the adjustable-voltage PoE switch.

Moreover, by allowing power selection modes which supplies power levels that are substantially higher than what the IEEE 802.3af protocol defines per PoE output port, devices consuming higher level of power than the limitation imposed by the IEEE 802.3af protocol can be connected to the adjustable-voltage PoE switch in accordance with an embodiment of the invention. Enabling the connection of higher-power devices to the adjustable-voltage PoE switch is an advantageous factor for deploying PoE connections for outdoor applications. Furthermore, the present invention also provides a weather-resistant housing and water-tight connections for the adjustable-voltage PoE switch for rugged outdoor application of the Power-over-Ethernet technology.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An adjustable-voltage Power-over-Ethernet (PoE) switch configured to provide data signals and/or output electrical powers to a plurality of output PoE ports, the adjustable-voltage PoE switch comprising:
   a plurality of input Ethernet ports configured to carry the data signals and/or one or more input electrical powers as an Ethernet data transfer or a Power-over-Ethernet (PoE) data transfer;
   a MAC interface between the plurality of input Ethernet ports and a microprocessor for the adjustable-voltage PoE switch, wherein the MAC interface analyzes and fetches a remote TCP/IP-based voltage adjustment instruction for a voltage adjustment of a particular output PoE port, and wherein the microprocessor executes the remote TCP-IP-based voltage adjustment instruction using a power source equipment (PSE) controller and at least one of plurality of controlled voltage sources to achieve the voltage adjustment of the particular output PoE port;
   the power source equipment (PSE) controller configured to control a delivery of a direct-current (DC) power as the output electrical powers to the plurality of controlled voltage sources, wherein the DC power is generated by a power supply unit;
   the plurality of controlled voltage sources configured to regulate output voltages for the output electrical powers in the plurality of output PoE ports;
   a plurality of transformers configured to combine or separate at least some portions of the output electrical powers from at least some portions of the data signals;
   the plurality of output PoE ports, wherein one of the plurality of output PoE ports is configured to supply some portions of the output electrical powers and some portions of the data signals to a first external device;
   an output voltage-adjusting interface configured to enable a user to select a specific output voltage for a specific output PoE port manually among the plurality of output PoE ports; and
   the microprocessor further configured to take input from the output voltage-adjusting interface and configured to control the PSE controller, the power supply unit, and the plurality of controlled voltage sources.

2. The adjustable-voltage PoE switch of claim 1, further comprising a plurality of light indicators corresponding to the plurality of output PoE ports, wherein a color of each light indicator represents an operating output voltage adjustable via the output voltage-adjusting interface.

3. The adjustable-voltage PoE switch of claim 2, wherein the microprocessor further controls the plurality of light indicators.

4. The adjustable-voltage PoE switch of claim 1, wherein the PoE switch further provides an IEEE 802.3af-compliant mode for at least one output port from the plurality of output PoE ports.

5. The adjustable-voltage PoE switch of claim 1, further comprising a memory unit operatively connected to the microprocessor, wherein at least some portion of the memory unit is user-programmable.

6. The adjustable-voltage PoE switch of claim 1, further comprising an outdoor-use housing, wherein the outdoor-use housing provides weather-resistance and encapsulates at least some portions of the adjustable-voltage PoE switch.

7. The adjustable-voltage PoE switch of claim 1, further comprising water-tight connectors for Ethernet wires and/or power wires.

8. The adjustable-voltage PoE switch of claim 1, wherein the plurality of output PoE ports transmits the output electrical powers less than 100 watts and the power supply unit generates a 48-volt and 2.5-amp power.

9. The adjustable-voltage PoE switch of claim 1, further comprising an alternate-current (AC) source output port configured to supply an AC electrical power to a second external device.

10. The adjustable-voltage PoE switch of claim 1, wherein the first external device can be a Voice-over-IP device, a network camera, a network access point, a router, a network bridge, or a communication device utilizing Power-over-Ethernet.

11. An adjustable-voltage Power-over-Ethernet (PoE) switch configured to provide data signals and/or output electrical powers to a plurality of output PoE ports, the adjustable-voltage PoE switch comprising:
   a plurality of input Ethernet ports configured to carry the data signals and/or one or more input electrical powers as an Ethernet data transfer or a Power-over-Ethernet (PoE) data transfer;
   a MAC interface between the plurality of input Ethernet ports and a microprocessor for the POE switch, wherein the MAC interface analyzes and fetches a remote TCP/IP-based voltage adjustment instruction for a voltage adjustment of a particular output PoE port, and wherein the microprocessor executes the remote TCP-IP-based voltage adjustment instruction using a power source equipment (PSE) controller and at least one of plurality of controlled voltage sources to achieve the voltage adjustment of the particular output PoE port;
   the power source equipment (PSE) controller configured to control a delivery of a direct-current (DC) power as the output electrical powers to the plurality of controlled voltage sources, wherein the DC power is generated by a power supply unit;
   the plurality of controlled voltage sources configured to regulate output voltages for the output electrical powers in the plurality of output PoE ports;
   a plurality of transformers configured to combine or separate at least some portions of the output electrical powers from at least some portions of the data signals;
   a first output PoE port from the plurality of output PoE ports configured to supply some of the data signals and a 12-volt and 1-amp power, a 18-volt and 1.5-amp power, a 24-volt and 1.5-amp power, a 48-volt and 1-amp power, or an IEEE 802.3af-compliant power to a first external device;
   an output voltage-adjusting interface configured to enable a user to select the 12-volt and 1-amp power, the 18-volt and 1.5-amp power, the 24-volt and 1.5-amp power, the 48-volt and 1-amp power, or the IEEE 802.3af-compliant power for the first output PoE port manually; and
   the microprocessor further configured to take input from the output voltage-adjusting interface and configured to control the PSE controller, the power supply unit, and the plurality of controlled voltage sources.

12. The adjustable-voltage PoE switch of claim 11, further comprising a plurality of light indicators corresponding to the plurality of output PoE ports, wherein a color of each light indicator represents an operating output voltage adjustable via the output voltage-adjusting interface.

13. The adjustable-voltage PoE switch of claim 12, wherein the microprocessor further controls the plurality of light indicators.

14. The adjustable-voltage PoE switch of claim 11, wherein the adjustable-voltage PoE switch further provides an IEEE 802.3af-compliant mode for at least one output port from the plurality of output PoE ports.

15. The adjustable-voltage PoE switch of claim 11, further comprising a memory unit operatively connected to the microprocessor, wherein at least some portion of the memory unit is user-programmable.

16. The adjustable-voltage PoE switch of claim 11, further comprising an outdoor-use housing, wherein the outdoor-use housing provides weather-resistance and encapsulates at least some portions of the adjustable-voltage PoE switch.

17. The adjustable-voltage PoE switch of claim 11, further comprising water-tight connectors for Ethernet wires and/or power wires.

18. The adjustable-voltage PoE switch of claim 11, wherein the plurality of output PoE ports transmits the output electrical powers less than 100 watts and the power supply unit generates a 48-volt and 2.5-amp power.

19. The adjustable-voltage PoE switch of claim 11, further comprising an alternate-current (AC) source output port configured to supply an AC electrical power to a second external device.

20. The adjustable-voltage PoE switch of claim 11, wherein the first external device can be a Voice-over-IP device, a network camera, a network access point, a router, a network bridge, or a communication device utilizing Power-over-Ethernet.

* * * * *